（12） United States Patent
Sun et al.

(10) Patent No.: US 9,197,704 B2
(45) Date of Patent: Nov. 24, 2015

(54) ELECTRONIC LABEL SYSTEM AND OPERATION METHOD THEREOF

(75) Inventors: Wei-Min Sun, Taipei (TW); Yao-Jen Hsieh, Hsinchu County (TW); Ming-Jong Jou, Tainan (TW); Chi-Mao Hung, Hsinchu (TW)

(73) Assignee: SiPix Technology Inc., Taoyuan (TW)

( * ) Notice: Subject to any disclaimer, the term of this patent is extended or adjusted under 35 U.S.C. 154(b) by 528 days.

(21) Appl. No.: 13/533,978

(22) Filed: Jun. 27, 2012

(65) Prior Publication Data

US 2013/0002406 A1 Jan. 3, 2013

(30) Foreign Application Priority Data

Jun. 28, 2011 (TW) .............................. 100122639 A

(51) Int. Cl.
*H04Q 5/22* (2006.01)
*H04L 29/08* (2006.01)

(52) U.S. Cl.
CPC ..................................... *H04L 67/12* (2013.01)

(58) Field of Classification Search
CPC .... G06F 3/14; G09G 5/02; G09G 2320/0693; G09G 2370/027; H04N 1/32512; H04N 1/32529; H04N 17/02; H04N 21/2343; H04N 21/25833; H04N 9/641; H04N 1/00204; H04N 1/00209; H04N 1/00214; H04N 1/00217
USPC ............. 340/10.6, 568.1, 539.13, 568.5, 988, 340/10.41, 572.1–572.9, 588, 591
See application file for complete search history.

(56) References Cited

U.S. PATENT DOCUMENTS

| | | | |
|---|---|---|---|
| 6,924,781 B1 * | 8/2005 | Gelbman | 345/85 |
| 7,013,289 B2 * | 3/2006 | Horn et al. | 705/14.51 |
| 7,514,646 B2 * | 4/2009 | Cira et al. | 209/583 |
| 8,072,314 B1 * | 12/2011 | Kuzma et al. | 340/10.4 |
| 8,441,351 B2 * | 5/2013 | Christopher | 340/568.1 |
| 2002/0165007 A1 * | 11/2002 | Gawne | 455/557 |
| 2004/0036626 A1 * | 2/2004 | Chan et al. | 340/870.17 |
| 2004/0263316 A1 * | 12/2004 | Dix et al. | 340/5.23 |
| 2010/0124920 A1 * | 5/2010 | Feher | 455/426.1 |

FOREIGN PATENT DOCUMENTS

| | | |
|---|---|---|
| CN | 101390112 | 3/2009 |
| CN | 201345111 | 11/2009 |

(Continued)

OTHER PUBLICATIONS

"Office Action of Taiwan Counterpart Application", issued on Oct. 29, 2013, p. 1-p. 7, in which the listed references were cited.

(Continued)

*Primary Examiner* — Daniel Previl
(74) *Attorney, Agent, or Firm* — Jianq Chyun IP Office

(57) ABSTRACT

An electronic label system and an operation method thereof are provided. The electronic label system includes a control unit and a plurality of electronic label units. The control unit is used for sending display information. The electronic label units are coupled to the control unit to receive the display information and display according to the corresponding display information, respectively. The electronic label units respectively output a plurality of state information to the control unit so that the control unit can monitor operation states of the electronic label units according to the state information.

21 Claims, 2 Drawing Sheets

(56) References Cited

FOREIGN PATENT DOCUMENTS

| | | |
|---|---|---|
| CN | 201765774 U | 3/2011 |
| CN | 201876908 U | 6/2011 |
| TW | I250457 | 3/2006 |
| TW | 200847039 | 12/2008 |
| TW | 200919228 | 5/2009 |
| TW | I311734 | 7/2009 |

OTHER PUBLICATIONS

"First Office Action of China Counterpart Application", issued on Jun. 30, 2014, p. 1-p. 7, in which the listed references were cited.

"Office Action of China Counterpart Application", issued on Aug. 13, 2015, p. 1-p. 6.

* cited by examiner

ELECTRONIC LABEL SYSTEM AND OPERATION METHOD THEREOF

CROSS-REFERENCE TO RELATED APPLICATION

This application claims the priority benefit of Taiwan application serial no. 100122639, filed on Jun. 28, 2011. The entirety of the above-mentioned patent application is hereby incorporated by reference herein and made a part of this specification.

BACKGROUND OF THE INVENTION

1. Field of the Invention

The invention relates to an electronic system and an operation method thereof. Particularly, the invention relates to an electronic label system and an operation method thereof.

2. Description of Related Art

In recent years, demands of applying displays in consumer electronics products, for example, e-signage, e-tags, e-books, smart cards and e-POP, etc. are gradually increased, especially when wireless construction and digital technology are increasingly mature.

In an electronic label system, a control unit generally transmits information to various label units through a wireless signal, and the label units display according to the received information, so that the label units can be arbitrarily configured without considering a circuit layout. However, since information transmission between the control unit and the label units is unidirectional, the control unit cannot obtain information from the various label units. Even when some label units cannot operate, the control unit still transmits information to the damaged label units. Moreover, after the label units are replaced, since the control unit does not receives information from the label units, the control unit cannot adjust a content of transmitted information according to the type of the label units. Therefore the label units may have display errors.

SUMMARY OF THE INVENTION

The invention is directed to an electronic label system, in which electronic label units transmit back a plurality of state information, so that a control unit is capable of monitoring operation states of the electronic label units, and generating display information corresponding to each of the electronic label units according to the state information of each of the electronic label units.

The invention provides an electronic label system including a control unit and a plurality of electronic label units. The control unit is used for sending display information. The electronic label units are coupled to the control unit for receiving the display information and displaying according to the corresponding display information respectively. The electronic label units respectively output a plurality of state information to the control unit so that the control unit monitors operation states of the electronic label units according to the state information.

In an embodiment of the invention, the electronic label system further includes a network unit. The network unit is coupled between the control unit and the electronic label units. The control unit transmits the display information to the electronic label units through the network unit via a wireless signal, and the electronic label units respectively transmit the corresponding state information to the network unit through the wireless signal, so as to transmit the state information to the control unit.

In an embodiment of the invention, each of the electronic label units includes a network connecting unit, a display unit and a detecting unit. The network connecting unit is coupled to the network unit or the control unit. The display unit is coupled to the network connecting unit for receiving the display information through the network connecting unit, and displaying according to the display information, and outputting device information to the network connecting unit. The detecting unit is coupled to the network connecting unit and the display unit for detecting operation state information of the display unit, and outputting the operation state information to the network connecting unit. The network connecting unit outputs the corresponding state information according to the device information and the operation state information.

In an embodiment of the invention, the display unit includes a display panel and a driving circuit. The driving circuit is coupled to the display panel and the network connecting unit for driving the display panel according to the display information.

In an embodiment of the invention, the display panel is one of a liquid crystal display (LCD) panel and an electrophoretic display panel.

In an embodiment of the invention, the network unit is coupled to the control unit through one of an Ethernet interface, an inter-integrated circuit interface, a serial peripheral interface, an RS232 interface and an ARM bus interface.

In an embodiment of the invention, the electronic label units are respectively coupled to the network unit through one of a WiFi communication protocol, a ZigBee communication protocol and a $3^{rd}$ generation (3G) mobile communication protocol.

In an embodiment of the invention, the electronic label units are coupled to the network unit through one of an Ethernet interface, an inter-integrated circuit interface, a serial peripheral interface, an RS232 interface and an ARM bus interface.

In an embodiment of the invention, the control unit generates the display information corresponding to each of the electronic label units according to the state information.

In an embodiment of the invention, the control unit is coupled to a server through an Ethernet, so as to obtain the display information corresponding to each of the electronic label units from the server.

In an embodiment of the invention, the server is coupled to a database through a virtual private network (VPN), so as to update the display information corresponding to each of the electronic label units through the database.

In an embodiment of the invention, the VPN is established in a wide area network.

The invention provides an operation method of an electronic label system, where the electronic label system includes a control unit and a plurality of electronic label units. The operation method includes following steps. The control unit sends display information to the electronic label units. The electronic label units display according to the corresponding display information, and respectively output a plurality of state information to the control unit. The control unit monitors operation states of the electronic label units according to the state information.

In an embodiment of the invention, the operation method of the electronic label system further includes that the control unit generates the display information corresponding to each of the electronic label units according to the state information.

In an embodiment of the invention, each state information includes a part of, all of or one of an operating temperature, an operating voltage, a display resolution and a display panel type.

According to the above descriptions, in the electronic label system and the operation method thereof of the invention, the electronic label units may transmit back state information, and the control unit monitors the operation states of the electronic label units according to the transmitted state information. Moreover, the control unit adjusts a message content, a size or a format of the display information according to the transmitted state information, so that the electronic label units can correctly receive the display information.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
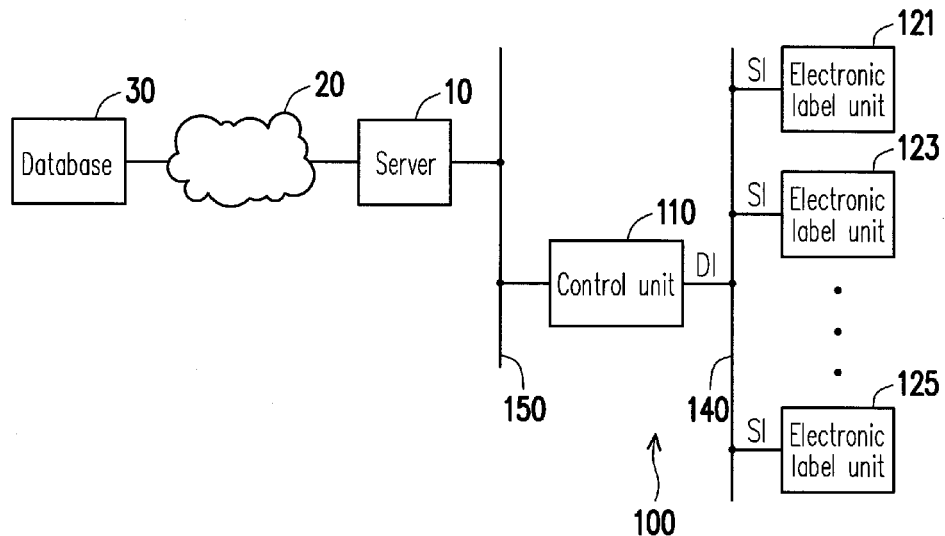
FIG. 1 is a system schematic diagram of an electronic label system according to an embodiment of the invention.

FIG. 1 is a system schematic diagram of an electronic label system according to an embodiment of the invention. Referring to FIG. 1, in the present embodiment, the electronic label system 100 includes a control unit 110 and a plurality of electronic label units (for example, 121, 123 and 125). The control unit 110 is used for sending display information DI. The electronic label units 121, 123 and 125 are coupled to the control unit 110 through a wiring 140 for receiving the display information DI and displaying according to the corresponding display information DI, respectively. The wiring 140 can be an Ethernet wiring, an inter-integrated circuit wiring, a serial peripheral wiring, an RS232 wiring or an ARM bus wiring, i.e. the electronic label units 121, 123 and 125 can be coupled to the control unit 110 through an Ethernet interface, an inter-integrated circuit interface, a serial peripheral interface, an RS232 interface or an ARM bus interface.

Moreover, the electronic label units 121, 123 and 125 transmit respective state information SI to the control unit 110 through the wiring 140, so that the control unit 110 can monitor operation states of the electronic label units 121, 123 and 125 according to the state information SI, where the state information SI, for example, includes a part of all of or one of an operating temperature, an operating voltage, a display resolution and a display panel type of the electronic label unit (121, 123 or 125), which can be determined by those skilled in the art. The state information SI can be transmitted when the states of the electronic label units (121, 123 and 125) are varied, when the system is booted, or once every predetermined period (for example, 5 seconds), which can be determined by those skilled in the art.

Moreover, the control unit 110 can adjust a message content, a size or a format of the display information DI according to the respective state information SI of the electronic label units 121, 123 and 125, so that the display information DI transmitted to the electronic label units 121, 123 and 125 can be correctly received. In the present embodiment, the electronic label units 121, 123 and 125 can respectively correspond to an address, and the display information DI may include address information, so that the electronic label units 121, 123 and 125 can receive and identify the corresponding display information DI.

On the other hand, in an embodiment of the invention, the wiring 150 can be the Ethernet wiring, i.e. the control unit 110 can be coupled to a server 10 through the Ethernet wiring 150, so as to obtain the display data corresponding to each of the electronic label units 121, 123 and 125 from the server 10, and accordingly generate the display information DI corresponding to each of the electronic label units 121, 123 and 125. Moreover, the server 10 can be coupled to a database 30 through a virtual private network 20 established in a wide area network, so as to update the display information DI corresponding to each of the electronic label units 121, 123 and 125 through the database 30. In other embodiments, the server 10 can be coupled to the database 30 through a local area network, though the invention is not limited thereto. Moreover, the server 10 can receive a remote command, and outputs display data to the control unit 110 according to the remote command, so as to control a part of, all of or one of display images of the electronic label units 121, 123 and 125 through the display information DI sent by the control unit 110.

Figure 2:
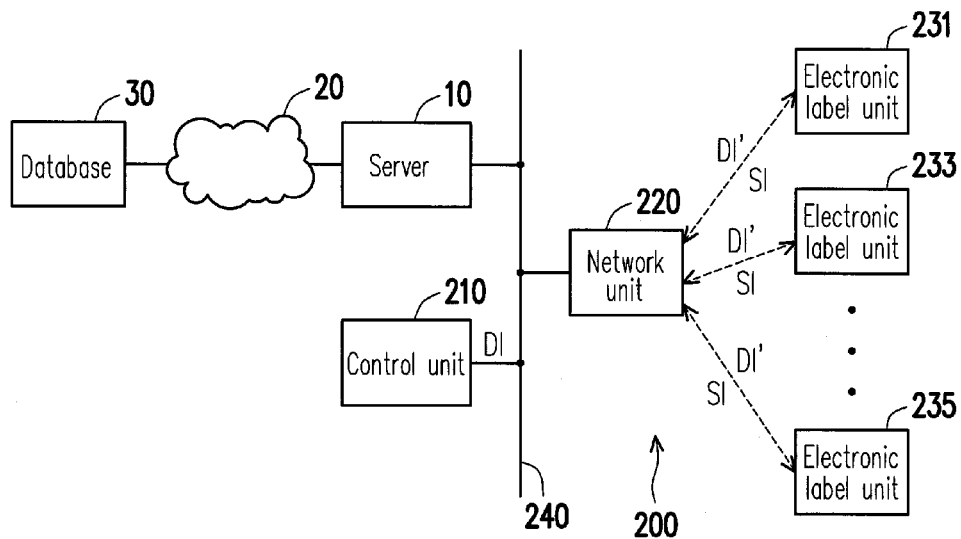
FIG. 2 is a system schematic diagram of an electronic label system according to another embodiment of the invention.

FIG. 2 is a system schematic diagram of an electronic label system according to another embodiment of the invention. Referring to FIG. 1 and FIG. 2, the differences between the electronic label system 100 and the electronic label system 200 lie in a control unit 210, a network unit 220 and electronic label units 231, 233 and 235. In the present embodiment, a wiring 240 is, for example, the Ethernet wiring, i.e. the network unit 220 can be coupled to the control unit 210 through the Ethernet. However, in other embodiments, the network unit 220 can be coupled to the control unit 210 through the inter-integrated circuit interface wiring, the serial peripheral interface wiring, the RS232 interface wiring or the ARM bus wiring. The electronic label units 231, 233 and 235 can be coupled to the network unit 220 through one of the WiFi communication protocol, the ZigBee communication protocol and the 3G mobile communication protocol.

The control unit 210 transmits the display information DI to the electronic label units 231, 233 and 235 through the network unit 220 via wireless signals (i.e. wireless signals DI'), so that the electronic label units 231, 233 and 235 respectively display according to the corresponding display information DI (i.e. the wireless display signals DI'). Moreover, the electronic label units 231, 233 and 235 respectively transmit the corresponding state information SI to the network unit 220 through the wireless signals, so as to transmit the state information SI to the control unit 210 through the network unit 220. The above wireless signals can be wireless signals that comply with one of the WiFi communication protocol, the ZigBee communication protocol and the 3G mobile communication protocol, or can be other types of radio frequency signals, which are not limited by the invention.

The control unit 210 monitors operation states of the electronic label units 231, 233 and 235 according to the received state information SI, and adjusts a message content, a size or a format of the display information DI according to the respective state information SI of the electronic label units 231, 233 and 235, so that the display information DI transmitted to the electronic label units 231, 233 and 235 can be correctly received.

Figure 3:
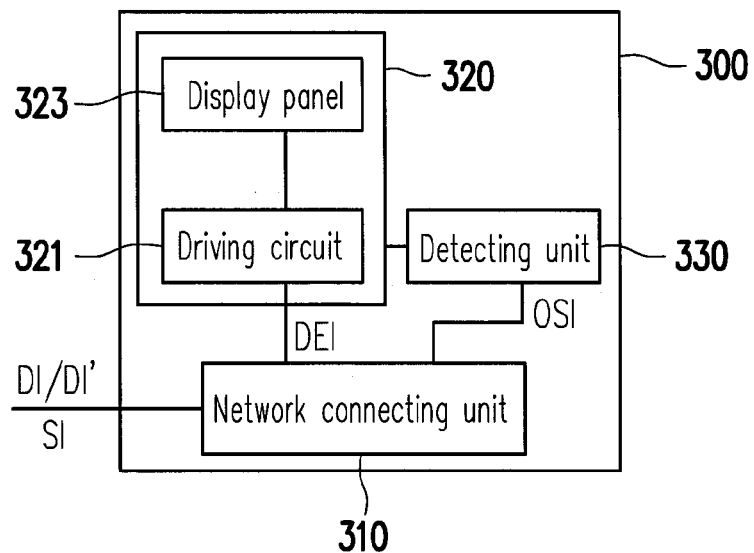
FIG. 3 is a block schematic diagram of an electronic label unit according to an embodiment of the invention.

FIG. 3 is a block schematic diagram of an electronic label unit according to an embodiment of the invention. Referring to FIG. 3, the electronic label unit 300 can be applied to the electronic label system 100 or the electronic label system 200, i.e. the electronic label unit 300 can be one of the electronic label units 121, 123 and 125, or can be one of the electronic label units 231, 233 and 235. In the present embodiment, the electronic label unit 300 includes a network connecting unit 310, a display unit 320 and a detecting unit 330. The display unit 320 includes a driving circuit 321 and a display panel 323.

Referring to FIG. 1 and FIG. 3, in different embodiments, the network connecting unit 310 is coupled to the control unit 110 or the network unit 220 for receiving the display information DI/DI' and outputting the state information SI. The driving circuit 321 is coupled to the display panel 323 and the network connecting unit 310 for driving the display panel 323 according to the display information DI/DI' received by the network connecting unit 310. The display panel 323 can be a liquid crystal display (LCD) panel or an electrophoretic display panel, though the invention is not limited thereto. Moreover, the driving circuit 321 outputs device information DEI to the network connection unit 310, where the device information DEI may include one of or all of a resolution of the display panel (i.e. a display resolution) and a type of the display panel (i.e. a display panel type).

The detecting unit 330 is coupled to the network connecting unit 310 and the display unit 320 for detecting operation state information OSI of the display unit 320, and outputting the operation state information OSI to the network connecting unit 310, where the operation state information OSI may include one of or all of an operating temperature and an operating voltage of the display unit 320. The network connecting unit 310 receives the device information DEI and/or the operation state information OSI, and outputs the corresponding state information SI according to the device information DEI and/or the operation state information OSI.

Figure 4:
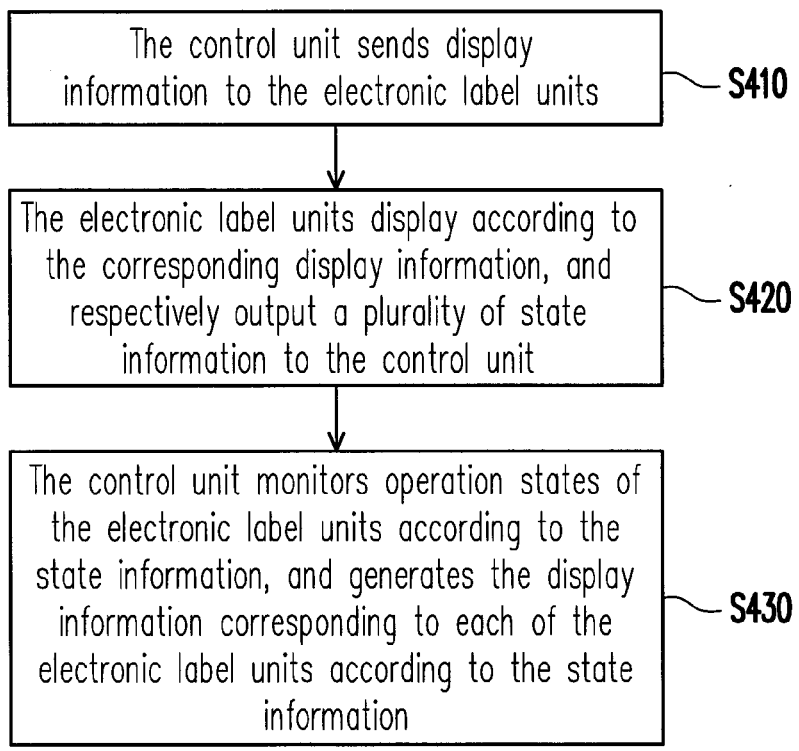
FIG. 4 is a flowchart illustrating an operation method of an electronic label system according to an embodiment of the invention.

FIG. 4 is a flowchart illustrating an operation method of an electronic label system according to an embodiment of the invention. Referring to FIG. 4, in the present embodiment, the electronic label system, for example, includes a control unit and a plurality of electronic label units. In step S410, the control unit sends display information to the electronic label units. In step S420, the electronic label units display according to the corresponding display information, and respectively output a plurality of state information to the control unit. Then in step S430, the control unit monitors operation states of the electronic label units according to the state information, and generates the display information corresponding to each of the electronic label units according to the state information. A sequence of the above steps are only used for descriptions, and the invention is not limited thereto. Please refer to the related descriptions of the electronic label systems 100 and 200 for the details of the steps, which are not repeated herein.

In summary, according to the electronic label system and the operation method thereof of the invention, the electronic label units may transmit back state information, and the control unit monitors the operation states of the electronic label units according to the transmitted state information. Moreover, the control unit adjusts a message content, a size or a format of the display information according to the transmitted state information, so that the electronic label units can correctly receive the display information.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic label system, comprising:
a control unit, sending display information; and
a plurality of electronic label units, coupled to the control unit, for receiving the display information and displaying according to the corresponding display information, wherein the electronic label units respectively output a plurality of state information to the control unit, so that the control unit monitors operation states of the electronic label units according to the state information and adjusts forms of the display information of the electronic label units according to the state information,
wherein the state information is transmitted to the control unit when a state of the electronic label units is varied.

2. The electronic label system as claimed in claim 1, further comprising:
a network unit, coupled between the control unit and the electronic label units, wherein the control unit transmits the display information to the electronic label units through the network unit via a wireless signal, and the electronic label units respectively transmit the corresponding state information to the network unit through the wireless signal, so as to transmit the state information to the control unit.

3. The electronic label system as claimed in claim 2, wherein each of the electronic label units comprises:
a network connecting unit, coupled to the network unit;
a display unit, coupled to the network connecting unit, for receiving the display information through the network connecting unit, displaying according to the display information, and outputting device information to the network connecting unit; and
a detecting unit, coupled to the network connecting unit and the display unit, for detecting operation state information of the display unit, and outputting the operation state information to the network connecting unit,
wherein the network connecting unit outputs the corresponding state information according to the device information and the operation state information.

4. The electronic label system as claimed in claim 3, wherein the display unit comprises:
a display panel; and
a driving circuit, coupled to the display panel and the network connecting unit, for driving the display panel according to the display information.

5. The electronic label system as claimed in claim 4, wherein the display panel is one of a liquid crystal display panel and an electrophoretic display panel.

6. The electronic label system as claimed in claim 2, wherein the network unit is coupled to the control unit through one of an Ethernet interface, an inter-integrated circuit interface, a serial peripheral interface, an RS232 interface and an ARM bus interface.

7. The electronic label system as claimed in claim 2, wherein the electronic label units are respectively coupled to the network unit through one of a WiFi communication protocol, a ZigBee communication protocol and a $3^{rd}$ generation (3G) mobile communication protocol.

8. The electronic label system as claimed in claim 1, wherein the electronic label units are coupled to the network unit through one of an Ethernet interface, an inter-integrated circuit interface, a serial peripheral interface, an RS232 interface and an ARM bus interface.

9. The electronic label system as claimed in claim 8, wherein each of the electronic label units comprises:
    a network connecting unit, coupled to the control unit;
    a display unit, coupled to the network connecting unit, for receiving the display information through the network connecting unit, displaying according to the display information, and outputting device information to the network connecting unit; and
    a detecting unit, coupled to the network connecting unit and the display unit, for detecting operation state information of the display unit, and outputting the operation state information to the network connecting unit,
    wherein the network connecting unit outputs the corresponding state information according to the device information and the operation state information.

10. The electronic label system as claimed in claim 1, wherein the control unit generates the display information corresponding to each of the electronic label units according to the state information.

11. The electronic label system as claimed in claim 1, wherein the control unit is coupled to a server through an Ethernet, so as to obtain the display information corresponding to each of the electronic label units from the server.

12. The electronic label system as claimed in claim 11, wherein the server is coupled to a database through a virtual private network, so as to update the display information corresponding to each of the electronic label units through the database.

13. The electronic label system as claimed in claim 12, wherein the virtual private network is established in a wide area network.

14. The electronic label system as claimed in claim 1, wherein each state information comprises a part of, all of or one of an operating temperature, an operating voltage, a display resolution and a display panel type.

15. The electronic label system as claimed in claim 1, wherein the state information is transmitted to the control unit when the label system is booted.

16. The electronic label system as claimed in claim 1, wherein the state information is transmitted to the control unit once every predetermined period.

17. An operation method of an electronic label system, wherein the electronic label system comprises a control unit and a plurality of electronic label units, the operation method of the electronic label system comprising:
    sending display information to the electronic label units by the control unit;
    displaying according to the corresponding display information, and respectively outputting a plurality of state information to the control unit by the electronic label units;
    monitoring operation states of the electronic label units by the control unit according to the state information; and
    adjusting forms of the display information of the electronic label units according to the state information,
    wherein the state information is transmitted to the control unit when a state of the electronic label units is varied.

18. The operation method of the electronic label system as claimed in claim 17, further comprising:
    generating the display information corresponding to each of the electronic label units by the control unit according to the state information.

19. The operation method of the electronic label system as claimed in claim 17, wherein each state information comprises a part of all of or one of an operating temperature, an operating voltage, a display resolution and a display panel type.

20. The operation method of the electronic label system as claimed in claim 17, wherein the state information is transmitted to the control unit when the label system is booted.

21. The operation method of the electronic label system as claimed in claim 17, wherein the state information is transmitted to the control unit once every predetermined period.

* * * * *